United States Patent [19]

Hammond

[11] 3,858,166
[45] Dec. 31, 1974

[54] RECOVERABLE UNDERWATER ACOUSTIC BEACON

[75] Inventor: John W. Hammond, York, Pa.

[73] Assignee: Charles D. Briddell, York, Pa.

[22] Filed: Dec. 26, 1973

[21] Appl. No.: 428,026

[52] U.S. Cl. .................. 340/5 R, 9/8 R, 294/83 R, 340/16 C
[51] Int. Cl. ........................ B63b 21/52, B63c 7/26
[58] Field of Search ....... 340/4 R, 5 R, 16 C; 9/8 R; 294/65.5, 66 R, 83 R

[56] References Cited
UNITED STATES PATENTS
| | | | |
|---|---|---|---|
| 3,316,531 | 4/1967 | Baker | 340/16 C X |
| 3,337,255 | 8/1967 | Nicoloff | 294/66 R |
| 3,553,795 | 1/1971 | McDougal | 340/5 R |

Primary Examiner—Richard A. Farley
Attorney, Agent, or Firm—C. Hercus Just

[57] ABSTRACT

A recoverable underwater acoustic beacon having a magnetic latch holds a marker buoy captive while submerged. The acoustic beacon sends out pulses of underwater sound so that it can be located and also has receiving means to detect a momentary continuous wave (CW) release command signal during the periods between pulses. A current flows through a neutralizing coil within the acoustic beacon when the CW release command signal is received. The neutralizing coil establishes a magnetic field through the beacon's non-magnetic shell to neutralize the magnetic field of an external permanent magnet and, through an associated leverage form of latch, releases the marker buoy to rise to the water surface on the end of a recovery cable.

7 Claims, 3 Drawing Figures

RECOVERABLE UNDERWATER ACOUSTIC BEACON

BACKGROUND OF THE INVENTION

The location of underwater objects such as fishing traps or other fishing equipment is often marked by a tethered marker buoy floating on the water surface. These buoys can be struck by passing boats and accidently lost. In addition, the buffeting due to wave action can contribute to the loss of the floating buoy and the object or objects whose position it was marking.

The recovery of objects such as fishing traps could be accomplished without the continuous presence of a marker buoy on the water surface if an acoustic beacon with command releaseable marker buoy was used. The desireable characteristics of such an acoustic beacon for a typical exemplary application in a bay or estuary preferably should be small size and weight, have a detection and location range of up to 1,000 feet, a battery life of several months in normal use, water immersion depth capability of up to about 30 feet, for example, and rapid means for reattaching the marker buoy and re-submersion of the acoustic beacon.

Recoverable underwater acoustic beacons are presently in use and acoustic means are employed to locate them and command a response from the beacon, such as the release of the beacon itself for recovery purposes. These beacons meet numerous needs in underwater projects, including ocean applications, that may require one or more of the following features; substantial range in terms of miles, ability to operate at water depths in terms of thousands of feet, long periods of submersion in terms of a year or more, selective response of the beacon to a specific form of command signal and other mechanical or electrical characteristics that may be dictated by a particular field of use. Many of these acoustic beacons are of substantial size and weight and are capable of performance that exceeds the needs of an application involving relatively shallow water, a small releaseable marker buoy load and short beacon range.

In addition, the prior art includes selectively releaseable latches or release machanisms that accomplish the release of a marker buoy or other device by various means. Included among the prior U.S. Pat. Nos. are 3,316,531 in the name of B. M. Baker, issued Apr. 25, 1967 and 3,553,795, issued to D. E. McDougal, issued Jan. 12, 1971. The McDougal patent discloses a hydraulically operated release arrangement more complex than necessary to accomplish applicant's purposes. The Baker patent effects release of a buoyant capsule by applying current adequate to heat and melt a fusible wire which restrains opening of latch mechanism. There is no signal emitting mechanism in either of these structures, whereby to effect release of the buoys, it is necessary to chart the submerged locations of them to be able to locate them for release or otherwise provide means to determine the location thereof.

SUMMARY OF THE INVENTION

An object of this invention is to provide a recoverable underwater acoustic beacon that weighs only a few pounds, is small in size, emits periodic acoustic signals for location detection, has a magnetic latch to release a marker buoy on command to float to the water surface and is adapted to placement and recovery, for example, by one person in a small boat having a signal receiver responsive to said emitted signals.

Another object of this invention is to provide a magnetic latch that uses a leverage principle to multiply the holding force of a permanent magnet.

Another object of this invention is to provide a magnetic latch whose magnetic fields for holding and releasing purposes are established through the beacon's non-magnetic shell such as stainless steel, for example, thus eliminating the need for moveable mechanical members to transmit motion between the inside and the outside of the beacon.

Another object of this invention is to provide a magnetic latch configuration that has no moving parts within the beacon's shell.

Another object of this invention is to provide a magnetic latch that uses the buoyant pull of the marker to lift the latch free of the anchored beacon, thus eliminating the need for springs or similar devices to effect such release.

Another object of this invention is to provide a magnetic latch that is easily restored to latched condition.

DETAILED DESCRIPTION

Figure 1:
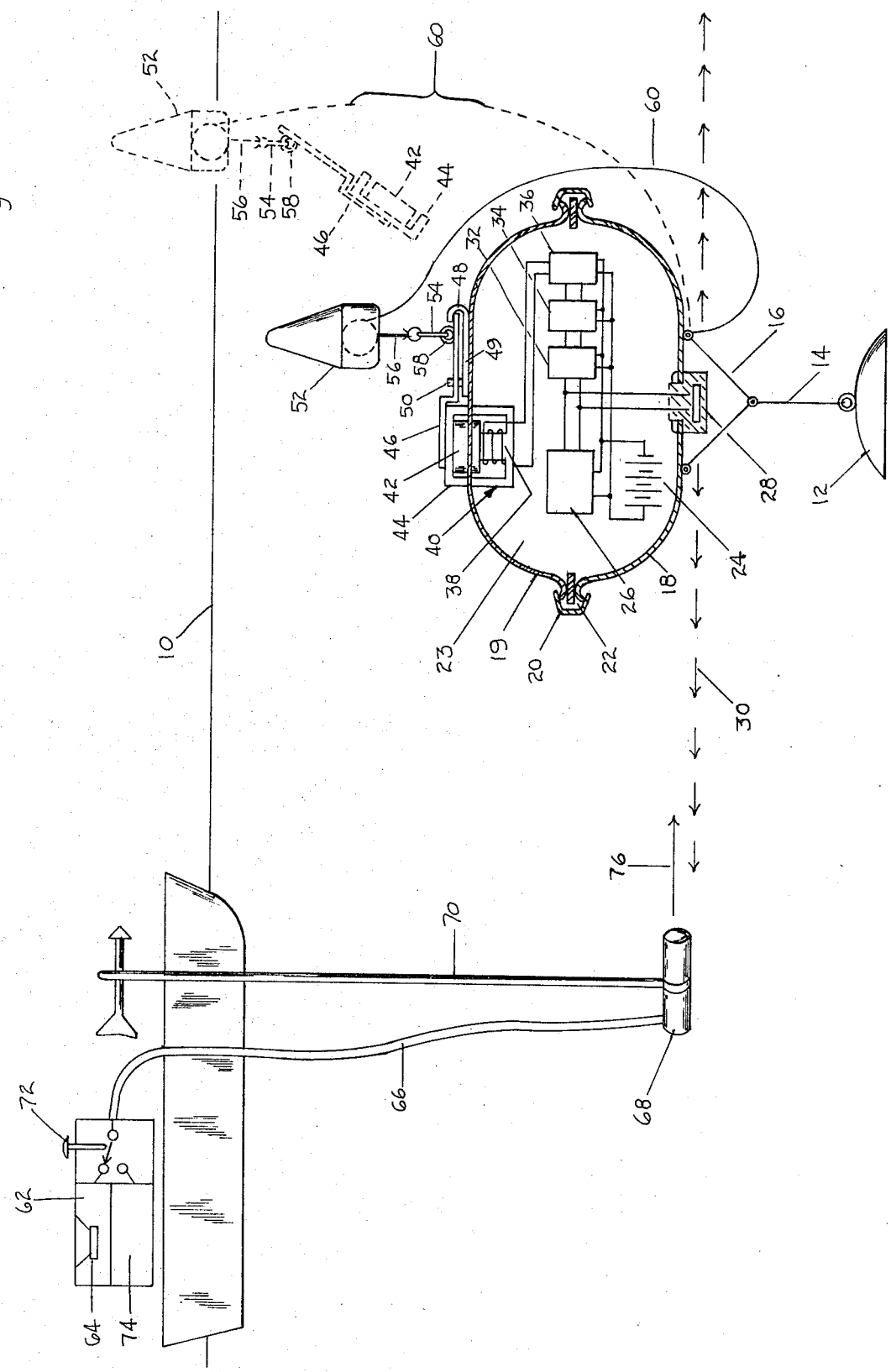
FIG. 1 is a diagrammatic side elevation, partly in section, showing the recoverable underwater acoustic beacon and associated receiver/transmitter with unidirectional hydrophone in accordance with the invention.

As shown in FIG. 1, the underwater acoustic beacon is held at the desired depth below the water surface 10 by an anchor 12 which is attached to the lower beacon shell 18 by means of anchor cable 14 and pivoted wire bail 16. The lower beacon shell 18 and upper beacon shell 19 are two somewhat flattened hemispherical dishes of non-magnetic material, such as stainless steel for example, the rims of which are held by annular clamp 20 against circular gasket 22 to obtain a watertight beacon 23 which encloses the electrical and electronic components described hereinafter.

Battery 24 within the beacon 23 is made up of a number of cells in series to obtain the desired voltage, as required by the electrical and electronic components described hereinafter. Battery 24 is connected by conventional wiring to the pulsed transistor oscillator/amplifier 26 which generates a steady series of pulses having a repetition rate in the low audible range. Each pulse "envelope" contains many cyclical oscillations at the frequency chosen to be sent through the water as a sound wave.

The output of the pulsed transistor oscillator/amplifier 26 is connected, by a circuit shown in FIG. 1, to the piezo-electric transducer 28 which converts the oscillations within each pulse "envelope" into sound pulses 30 which are propagated through the surrounding water medium in an omnidirectional pattern in the horizontal plane. The steady series of sound pulses 30 emanating from piezo-electric transducer 28 provides an acoustic beacon signal in the water medium that is used to determine the approximate location of the underwater acoustic beacon.

Battery 24 is also connected by conventional parallel circuitry to transistor receiver 32, transistor detector 34 and transistor switch 36. Transistor receiver 32 comprises a tuned transistor amplifier which, in turn, drives a transistor detector 34, the voltage output of which is connected to transistor switch 36. It will be noted in FIG. 1 that the piezo-electric transducer 28 is also connected to the input of transistor receiver 32 in addition to being connected to the output of pulsed transistor oscillator/amplifier 26. This permits the piezo-electric transducer 28 to act as a receptor of sound signals in the surrounding water medium during the relatively long periods between pulses from pulsed transistor oscillator/amplifier 26.

When the input signal of transistor receiver 32 consists mainly of the pulses generated by pulsed transistor oscillator/amplifier 26, the average current and output voltage of transistor detector 34 are low because the pulses are of short duration and repeated at a low rate. As a result, the transistor switch 36 remains in a non-conductive condition and no current flows in release coil 38 to which it is connected by circuitry shown in FIG. 1.

When no current is present in release coil 38, the magnetic circuit 40, as shown in FIG. 1, acts as a path for the flux created by permanent magnet 42 acting through armature 44 and through the non-magnetic upper beacon shell 19. The magnetic field generated thus by permanent magnet 42 creates a holding force which retains armature 44 against the upper beacon shell 19 and, in turn, latch 46, which is affixed to armature 44, is held firmly in the engaged or latched position relative to the latching end 48 of holding plate 49 and alignment pin 50 which are attached by welding or other suitable bonding to the upper beacon shell 19. The latching elements just described are formed either from non-corrosive materials or are suitably coated or plated to resist corrosion by the surrounding water.

Marker buoy 52 also is non-corrosive and is attached to latch 46 by means of a small pivoted wire bail 54 and a short section of non-corrosive tether cable 56. Wire bail 54 engages a metal loop 58 which is affixed to latch 46 near the latching end 48 of holding plate 49 as shown in FIG. 1. The force required to be exerted on tether cable 56 to release latch 46 from holding plate 49 is many times the holding force of permanent magnet 42. This is due to the lever-arm relationship comprising the relatively short distance from metal loop 58 to the latched end of latch 46 and the much longer distance from permanent magnet 42 to the latched end of latch 46.

OPERATION OF THE SYSTEM

A boat is maneuvered to the immediate vicinity of the anchored underwater acoustic beacon by observation of the direction of arrival and the intensity of sound pulses 30 emanating from piezo-electric transducer 28 mounted on beacon 23. When within range, the sound pulses 30 are picked up by unidirectional transducer 68 immersed in the water medium on the end of search rod 70 and connected by shielded conductive cable 66 to receiver 62, as shown in FIG. 1. Unidirectional transducer 68 converts the sound pulses 30 into electrical signals which are amplified by receiver 62 and reproduced as audible sound pulses on loudspeaker 64. The sound pulses from loudspeaker 64 are at a maximum when search rod 70 and unidirectional transducer 68 are pointed toward beacon 23, thus giving a line of direction to be followed to reach the immediate vicinity of the beacon 23. Receiver 62 has means for manual control of its amplification to prevent overloading which would interfere with the direction finding function. When the boat has approached to within 100 feet, more or less, from the beacon 23, as indicated by the presence of strong sound pulses 30, the release of marker buoy 52 can be accomplished by momentarily depressing switch 72, as shown in FIG. 1, thereby connecting unidirectional transducer 68 to continuous wave (CW) transmitter 74, thereby generating an acoustic impulse 76 in the water medium.

The acoustic impulse 76 directed toward the anchored beacon 23 is detected by an acoustical/electrical impulse receiving means within beacon 23 consisting of piezo-electric transducer 28, transistor receiver 32, transistor detector 34, transistor switch 36 and release coil 38. The acoustic impulse impinging on transducer 28 generates an electrical signal which is amplified by a tuned transistor amplifier in transistor receiver 32 which drives transistor detector 34 to an average output current and voltage of sufficiently high level to trigger transistor switch 36. When transistor switch 36 is triggered, it completes a circuit therefrom to release coil 38 and a current flows through said coil 38 by means of the conventional circuit shown in FIG. 1.

A current of sufficient magnitude flows through release coil 38 in such a direction that a magnetic field is created in opposition to the field of permanent magnet 42. Consequently the flux generated by permanent magnet 42 in magnetic circuit 40 is neutralized by the operation of said acoustical/electrical impulse receiving means and thus no force exists to hold armature 44 against non-magnetic upper beacon shell 19. The buoyant force of marker buoy 52 acting upon tether cable 56 and pivoted wire bail 54 then is sufficient to lift latch 46 instantly free from alignment pin 50 and the latch 46 frees itself from holding end 48 of holding plate 49. The marker buoy 52 then rises to the water surface 10 as it unreels recovery cable 60, as shown in the released position by the broken line illustration in FIG. 1.

When the energy level of battery 24 is above the the minimum necessary to create a neutralizing current as aforesaid, the somewhat higher current in release coil 38 creates a magnetic field of such magnitude that magnet 42 is repelled to varying degrees thus assisting in the separation of latch 46 from holding plate 49 as described.

When two or more beacons are to be anchored within range of one another, differing pulse repetition rates for each beacon can be selected, before immersion, to enable the ear to distinguish between beacon signals as an aid in locating the desired beacon only.

For practical purposes, for example, anchor 12 is secured by cable or chain to an object to be recovered, such as a fishing trap or the like. Thus any object or objects that have been attached to anchor 12 can be withdrawn from the water by means of recovery cable 60 which is attached to lower beacon shell 18 which, in turn, is attached to anchor bail 16, anchor cable 14 and anchor 12.

Figure 2:
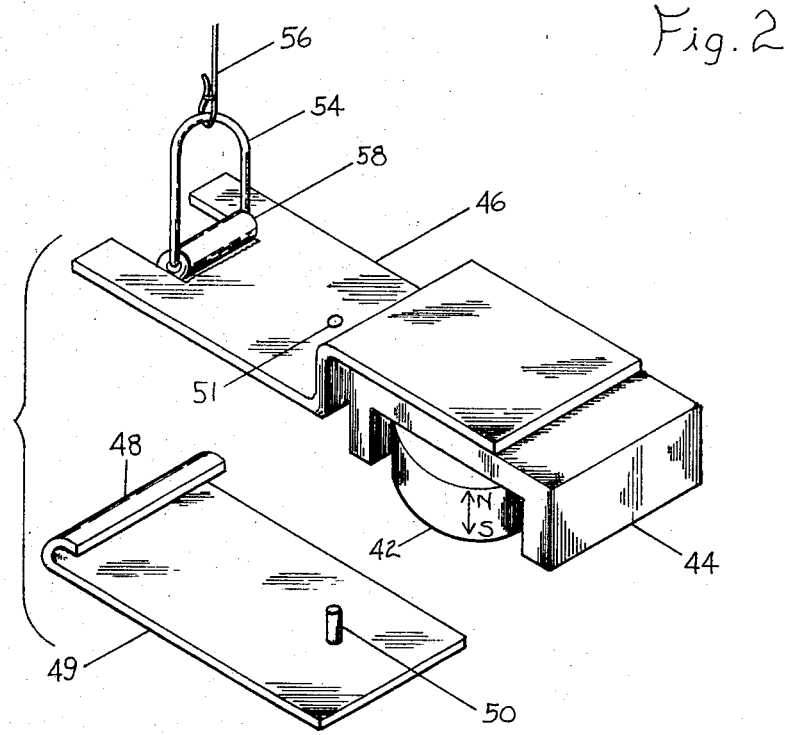
FIG. 2 is an exploded perspective view of the magnetic latch illustrating the disengaged position of the components.
Figure 3:
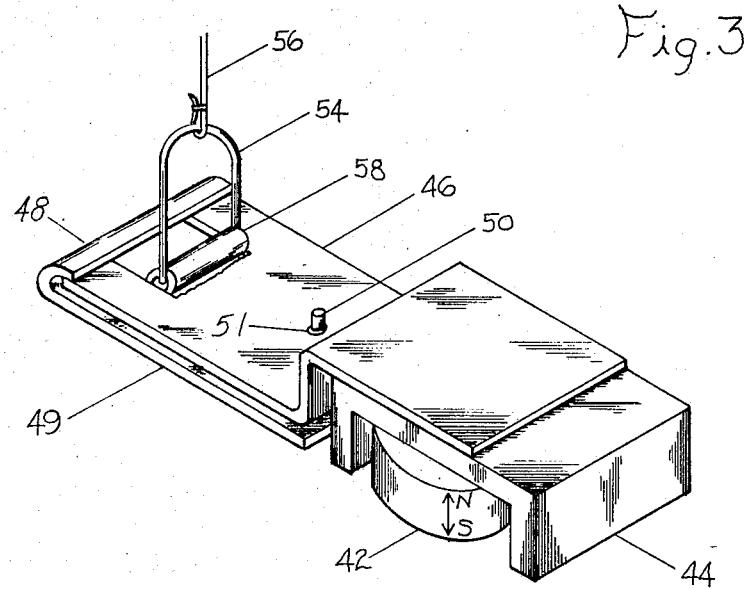
FIG. 3 is a perspective view of the magnetic latch shown in FIG. 2 but illustrating the components in a latched position.

Because the magnetic latch mechanism comprises such an important feature of the invention and is so important in the functioning of the recoverable underwater acoustic beacon, it is illustrated in greater detail and on a larger scale in FIGS. 2 and 3. FIG. 2 comprises an exploded perspective view of the magnetic latch illustrative of the disengaged position of the components. Holding plate 49 is attached by welding or bonding to the non-magnetic upper beacon shell 19 as shown in FIG. 1. One end 48 of holding plate 49 is curled over for the purpose of engaging and retaining one end of latch 46. In addition, alignment pin 50 on holding plate 49 is received within a matching aligning hole 51 in latch 46.

Armature 44 is composed of magnetic material and is attached to latch 46 as shown in FIG. 2 by any of a number of means such as welding, riveting or bonding. Permanent magnet 42 is selected from the types available to have adequate magnetic properties and stability and is magnetized, as shown by direction arrow, and affixed to the center of armature 44 with the open face of magnet 42 in line with the edges of armature 44 as shown in FIG. 2. The point at which metal loop 58 with pivoted wire bail 54 is attached to latch 46, as shown in FIG. 2, is chosen to obtain a desired leverage action which, for example, will enable permanent magnet 42 to maintain its position against upper beacon shell 19 of beacon 23 against a pull on pivoted wire bail 54 of up to, preferably, about eight or ten times its own holding force.

FIG. 3 is a perspective view of the magnetic latch shown in FIG. 2 but illustrates the components in a latched position. Latching is accomplished by placing the end of latch 46 adjacent to metal loop 58 under the folded-over edge 48 of holding plate 49 and then lowering latch 46 to position alignment pin 50 in hole 51 as shown in FIG. 3. This latching action places the face of permanent magnet 42 and the edges of armature 44 flush with the surface of upper beacon shell 19.

Holding plate 49 is positioned on upper beacon shell 19, as shown in FIG. 1, so that permanent magnet 42 and the edges of armature 44 are properly aligned with the magnetic circuit 40 that is within the upper beacon shell 19. Accurate alignment insures that the reluctance of the magnetic path through armature 44, the non-magnetic upper beacon shell 19 and the magnetic circuit 40 is as low as possible so that permanent magnet 42 will have its maximum holding force. As long as permanent magnet 42 with armature 44 holds tightly against the upper beacon shell 19, as shown in FIG. 1, the latch 46 is firmly retained because the folded over edge 48 of holding plate 49 prevents the engaged end of latch 46 from lifting and it also prevents latch 46 from rotating about alignment pin 50. As indicated above, all exposed elements of the latching mechanism shown in the figures of the drawing and described above are either formed, where possible, from material non-corrosive to water and especially sea water, or are plated or coated to render the same non-corrosive thereto.

From the foregoing it will be seen that a relatively low cost, short range retrieval system for use in shallow water by the fishing industries, and for other similar purposes, is provided which is effective to first locate a beacon and then release a marker buoy, thereby to permit withdrawing an object connected to the buoy and beacon from the water. If desired, the retrieved elements then may be suitably serviced and restored to condition for replacement in the water for continued use as intended.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. A recoverable underwater acoustic beacon system comprising in combination, mechanism to be anchored at a desired location relative to the bed of a body of water and including an anchor to be disposed upon said bed and an acoustic beacon connected thereto for positioning below the upper level of said body of water, electrically-powered acoustical signal-producing means within said beacon operable automatically to emit signals at periodic time intervals, receiving means within said beacon responsive to an acoustic impulse from an exterior source, a buoyant marker and a tether extending between said marker and said anchored mechanism, magnetically operated latch means on said anchored mechanism operable normally to secure said buoyant marker in desired position below the upper level of said body of water, and acoustical electrical impulse-receiving means operable relative to said latch means when said signal receiving means receives an impulse from said exterior source to neutralize the magnetic effect of said latch means and thereby cause said latch to release said buoyant marker and permit it to rise to the upper surface of said body of water while tethered to said anchored mechanism and thereby disclose the location thereof for retrieval.

2. The system according to claim 1 further including a mobile acoustical signal-receiving means and an acoustic impulse-sending unit adapted to be moved along the upper surface of said body of water and including a unidirectional transducer connected in circuit with said signal receiving means and movable about a vertical axis to determine the direction from which said acoustical signal is being projected, and control means connected to said impulse-sending unit and operable to discharge an acoustic impulse toward said beacon when submerged to actuate said latch and release said marker as aforesaid.

3. The system according to claim 1 in which said latch is mounted upon said acoustic beacon.

4. The system according to claim 3 in which said latch is mounted upon the exterior of said acoustic beacon and said acoustical electrical impulse-receiving means includes an electro-magnetic coil mounted within said acoustic beacon immediately in alignment with said latch to operate the same when an impulse is received thereby.

5. The system according to claim 1 in which said magnetically-operated latch comprises a lever releasably anchored at one end to said acoustic beacon, a permanent magnet connected to said lever adjacent the opposite end thereof and adapted to magnetically engage the exterior of said acoustic beacon, attaching means on said lever closer to said one end than said magnet, and means connecting said buoyant marker in anchored relation to said attaching means on said latch to retain said marker in submerged position until said latch is actuated by neutralizing said magnet to release said marker and permit it to rise as aforesaid.

6. The system according to claim 5 in which said latch further includes a holding member affixed to the exterior of said beacon and from which said latch is completely detachable when said magnet is neutralized, whereby said latch is carried by said buoyant marker when it rises, and said tether is connected between said acoustic beacon and said marker.

7. The system according to claim 6 in which said holding member comprises a plate affixed to said acoustic beacon and having a latch-retaining end thereon arranged to overlie said one end of said latch to prevent movement thereof from said beacon in a direction substantially perpendicularly therefrom while said magnet retains the opposite end of said latch adjacent said exterior of said beacon, whereby when said magnet is neutralized the buoyant effect of said marker is fully adequate to remove said one end of said latch from said overlying latch-retaining end of said plate.

* * * * *